Jan. 5, 1960  WING H. FONG  2,919,773
COMBINED ACCELERATOR AND BRAKE CONTROL FOR MOTOR VEHICLES
Filed Aug. 16, 1957  3 Sheets-Sheet 1
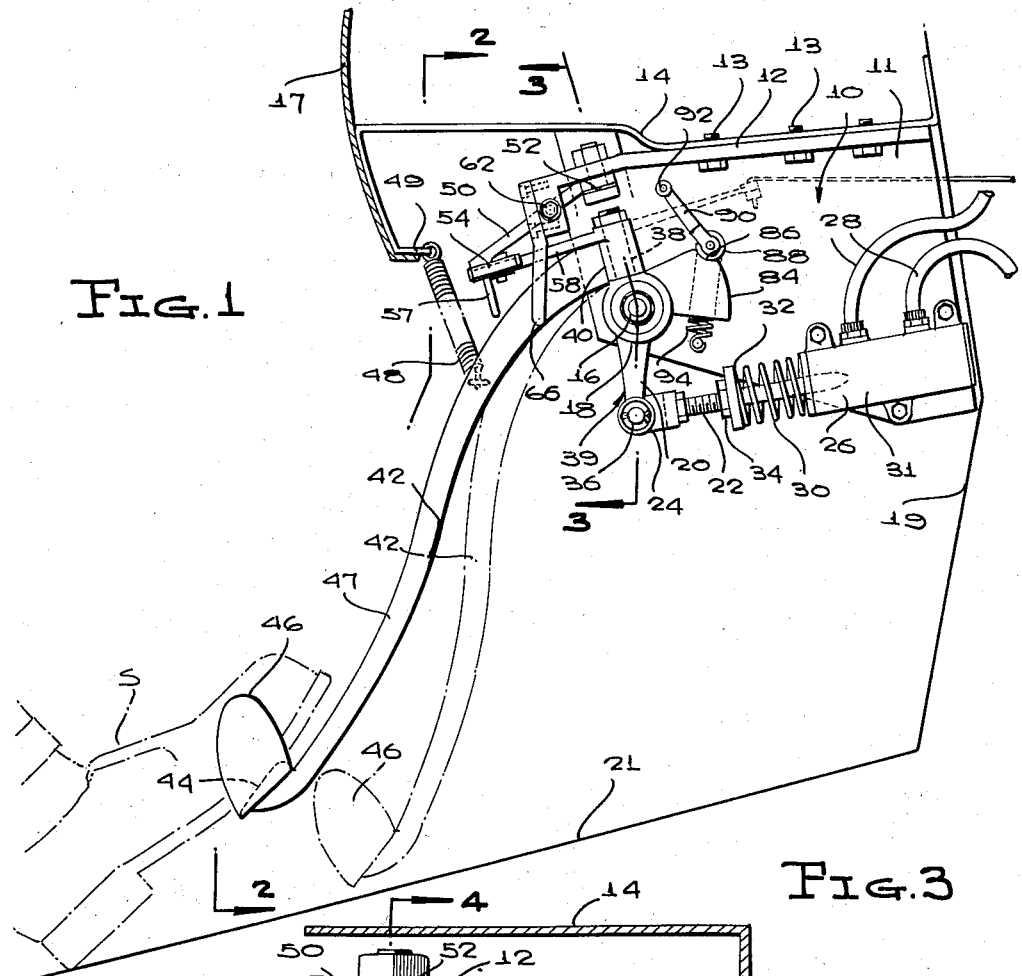
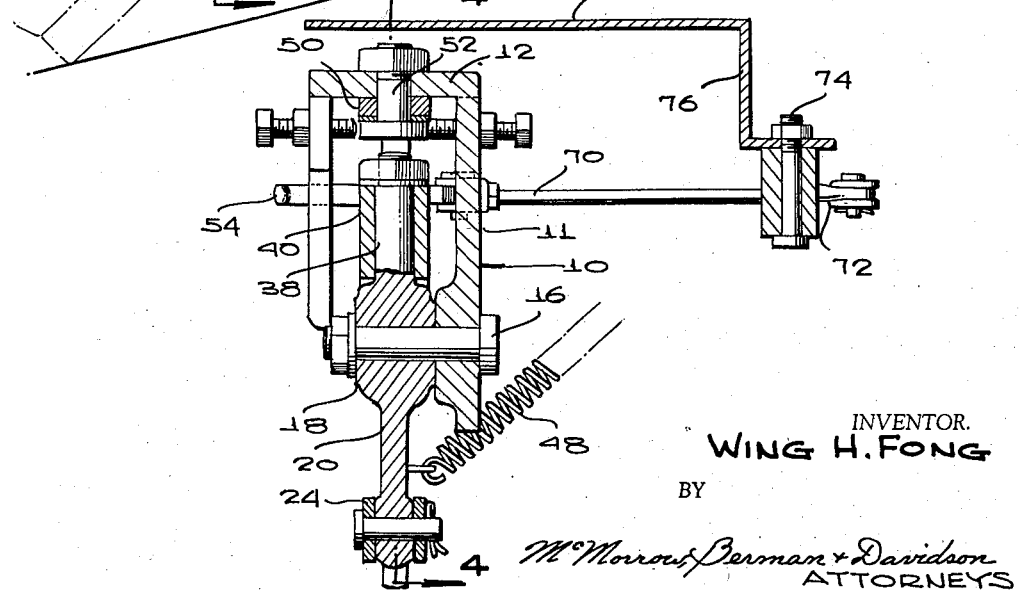
INVENTOR.
WING H. FONG
BY
McMorrow, Berman + Davidson
ATTORNEYS Jan. 5, 1960 WING H. FONG 2,919,773
COMBINED ACCELERATOR AND BRAKE CONTROL FOR MOTOR VEHICLES
Filed Aug. 16, 1957 3 Sheets-Sheet 2
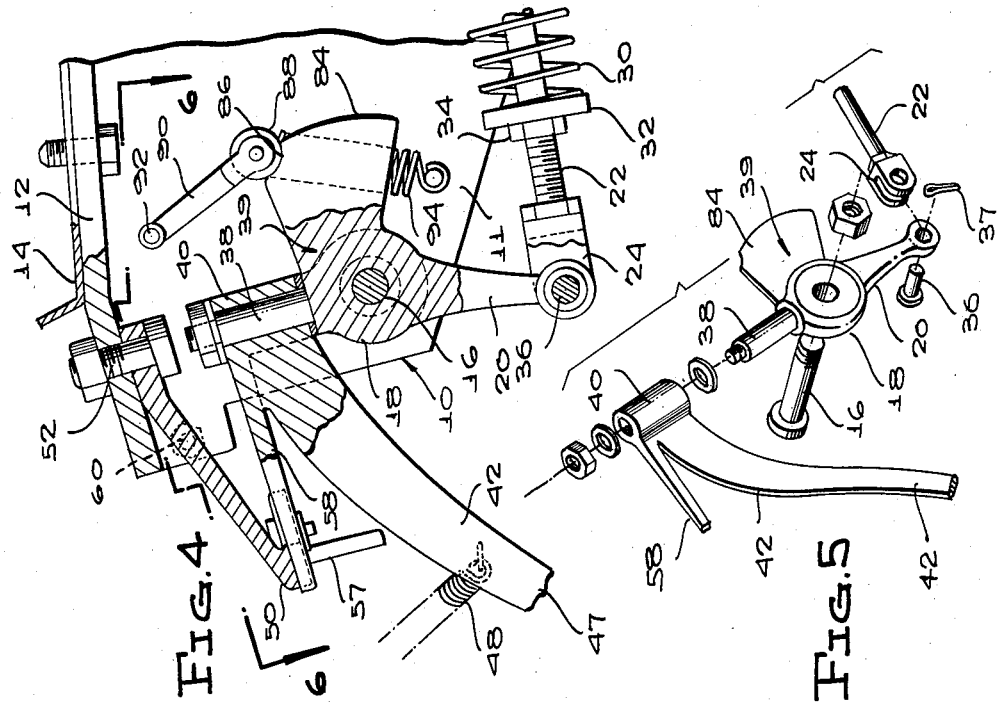
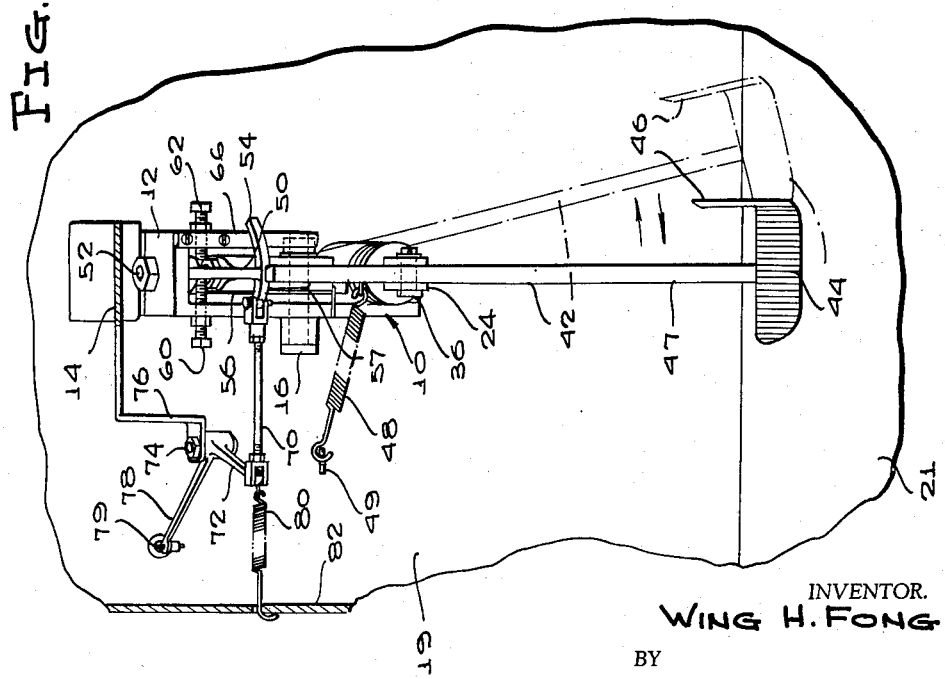
INVENTOR.
WING H. FONG
BY
McMorrow, Berman & Davidson
ATTORNEYS

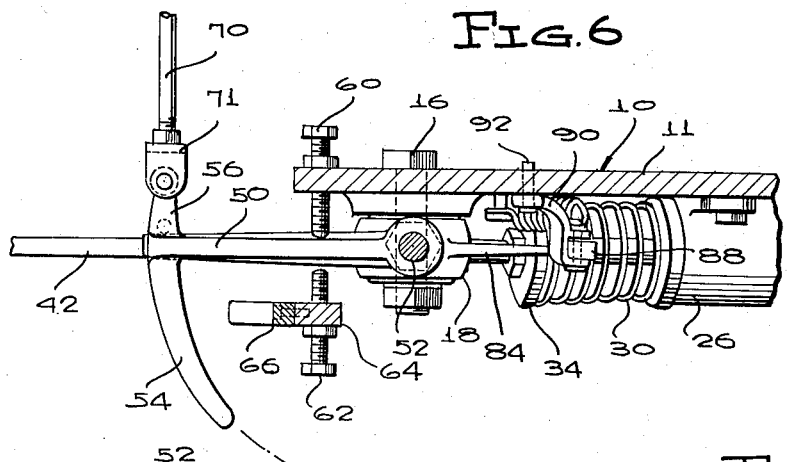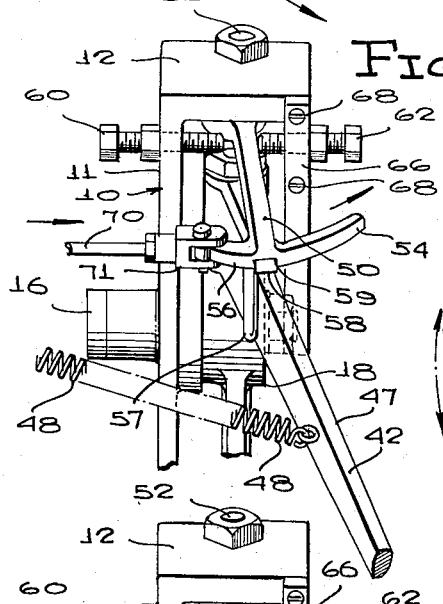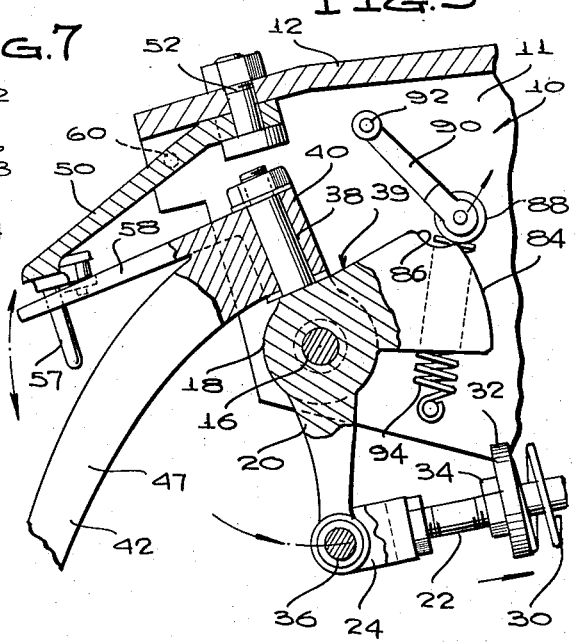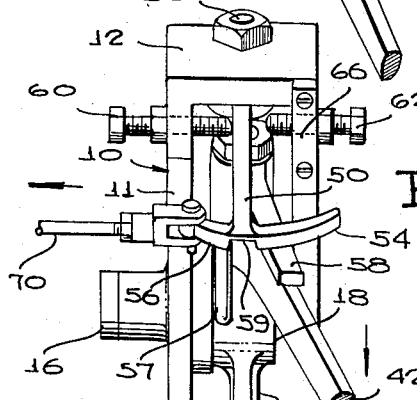

United States Patent Office 2,919,773
Patented Jan. 5, 1960

2,919,773

COMBINED ACCELERATOR AND BRAKE CONTROL FOR MOTOR VEHICLES

Wing H. Fong, Hongkong, China

Application August 16, 1957, Serial No. 678,483

4 Claims. (Cl. 192—3)

This invention relates to a combination accelerator and brake for a motor vehicle, and more particularly has regard to an improved device of this nature, which, by reason of the novel construction thereof, will be efficient in operation, while still being more simplified in design and lower in cost, than devices previously conceived for the same purpose.

One important object of the invention is to provide, in a combination accelerator and brake for motor vehicles, a pedal arrangement wherein the pedal is pivotally supported from a mechanism disposed above the pedal, so that the pedal is completely clear of the floor board, as distinguished from previous devices of the same nature in which the combination accelerator and brake pedal has been rockably mounted upon the floor board. The invention, thus, adapts combination accelerator and brake control devices for installation in modern vehicles, which are characterized by the overhead suspension of brake and accelerator pedals.

Another object is to provide, in a combination device of the character described, means that will be particularly adapted for efficiently disconnecting automatically, the throttle control and returning the same to idling position, responsive to application of the vehicle brakes.

Another object is to provide a combination accelerator and brake control, so designed that there will be minimum possibility of interference between operation of the accelerator or throttle mechanism, and operation of the brake-actuating mechanism of the vehicle.

Another object is to provide a device which will be particularly characterized by the speed with which one can change from operation of the vehicle throttle to actuation of the vehicle brakes, thus to reduce considerably the amount of time required to bring the vehicle to a stop in the event of emergency.

Another object is to so design the combination device that the foot of the operator will be kept in a comfortable and natural position at all times while the speed of the vehicle is being controlled, while said foot is still being maintained in complete readiness for application of the vehicle brakes.

Still another object is to so form the combination device that it will be simple in design, thus to permit manufacture thereof at a relatively low cost, with this characteristic further being adapted to reduce considerably the cost of maintenance and repair, the mechanism further being designed to be swiftly and easily accessible for inspection, repairs, or ordinary maintenance.

Another object is to mount the entire mechanism of a device of the nature described directly under the instrument panel of the vehicle, within the passenger compartment, with said mechanism including the master cylinder of the vehicle brake system, whereby said mechanism will not only have the above mentioned ready accessibility for maintenance and repair, but also will be disposed in a completely out-of-the-way position, a substantial distance above the floor board, in back of the instrument panel.

Other objects will appear from the following description, the claims appended thereto, and from the annexed drawing, in which like reference characters designate like parts throughout the several views, and wherein:

Figure 1 is a side elevational view of a device according to the present invention, with the pedal being shown in full and dotted lines in its throttle-operating and braking positions, respectively;

Figure 2 is a front elevational view of the device as seen from the line 2—2 of Figure 1, the pedal being shown in full and dotted lines in its idling and vehicle-accelerating positions, respectively;

Figure 3 is an enlarged transverse sectional view through the device substantially on line 3—3 of Figure 1;

Figure 4 is an enlarged, fragmentary longitudinal sectional view through the device, on the same scale as Figure 3, taken substantially on line 4—4 of Figure 3;

Figure 5 is a fragmentary, exploded perspective view of the pedal and the pedal mounting means of the device;

Figure 6 is a horizontal sectional view, on the same scale as Figure 4, taken substantially on line 6—6 of Figure 4;

Figure 7 is a fragmentary front elevational view of the device, on an enlarged scale, with the pedal moved laterally for producing acceleration of the vehicle;

Figure 8 is a view like Figure 7 in which the pedal, while in its laterally shifted position, has been depressed to disengage the throttle and actuate the vehicle brakes; and Figure 9 is a view like Figure 4 in which the pedal has been depressed in the manner shown in Figure 8, to actuate the brakes.

Referring to the drawings in detail, the combination accelerator and brake operating mechanism 10 includes a vertical bracket plate 11 of substantial area, said plate being approximately trapezoidal in outer configuration and being integral along its top edge with a laterally projecting flange 12 secured by screws 13 or the like to a support bar 14, which extends between the vehicle intrument panel 17 and the fire wall 19 (see Figure 1). As will be noted, the entire mechanism is carried by the bracket defined by plate 11 and flange 12, and is secured to the underside of the member 14, in back of the instrument panel 17, a substantial distance upwardly from the floor board 21 of the vehicle.

Projecting laterally of plate 11, through an opening formed in the lower portion of said plate, is a fulcrum or pivot pin 16 (see Figures 3 and 4), passing through an opening of a main lever 18, which lever has a thickened center portion through which the pivot pin 16 extends. The lever, as shown in Figure 4, has a depending arm 20, and extending to the lower end of the arm 20 is the push rod or plunger 22 of the master cylinder of the braking system of the vehicle, said push rod being provided with a connecting fork or clevis 24, which is threadedly attached to the push rod and is thus adapted for adjustment to selected positions longitudinally of the push rod. Clevis 24 embraces the lower end of the lever 20, and is pivotally connected to the lever, in a manner to be made presently apparent.

Referring to Figure 1, the braking system includes a vehicle master cylinder 26, which is secured to the lower portion of the plate 11, with the push rod 22 being axially reciprocable within the master cylinder. The master cylinder is conventional per se, and includes the usual flexible hoses 28, 28, one extending from the brake fluid reservoir, and the other extending to the several wheel brake cylinders.

A compression, coil spring 30 receives the push rod 22, abutting at one end against the adjacent, outer end wall of the cylinder housing 31, with the other end of said spring abutting against a disc-like retainer 32, circumposed about the push rod and adjustable longitudinally of the push rod to effect corresponding adjustments in the tension of the spring, through the medium of a nut 34 that is threadedly engaged with the push rod.

From this, it will be seen that the entire master cylinder assembly is mounted directly upon the plate 11, within the passenger compartment of the vehicle, as distinguished from conventional braking arrangements wherein the master cylinder is disposed below the floor board 21, or in front of the fire wall 19, within the vehicle engine compartment.

It will further be seen that on swinging movement of the main or master lever about the axis defined by pin 16, within a vertical plane, in a counterclockwise direction viewing the same as in Figure 1 or 4, the push rod 22 will be shifted to the right in these figures of the drawing, through its pressure stroke, to apply the vehicle brakes. At this time, the lever and the push rod will be moved to the Figure 9 position, away from their normal position shown in Figure 4.

The pivotal connection between the clevis 24 and lever 20 has been designated at 36, and as shown in Figure 5, comprises a pin extending through aligned openings of the lever and clevis, and held in place by means of a cotter key 37.

The main lever also includes, as an integral part thereof, an upwardly projecting, cylindrical spindle 38, also extending radially from the pivot axis of the lever, but disposed almost diametrically opposite the depending arm 20 of the main lever. The main lever, in this connection, has been generally designated at 39 in the several figures of the drawing, and comprises a one piece member, which may be cast or otherwise rigidly constituted, and which has the form shown in Figure 5 to particular advantage.

Spindle 38 extends through a sleeve 40 formed upon the upper, proximal end of a combination accelerator and brake pedal 42. Pedal 42 extends downwardly from the spindle 38, as shown to best advantage in Figure 1, toward the floor board 21, in a direction toward the vehicle operator, whose shoe has been designated by the reference numeral S in Figure 1. The arm of the combination pedal can be gently, compoundly curved as shown in Figure 1, although this particular configuration is not essential to successfully practicing the invention.

At its distal or outer end, the pedal is integrally formed with a treadle or foot plate 44, extending transversely of the body or arm portion of the pedal and formed integrally, at one side, with an upwardly projecting side piece or abutment 46 that is offset laterally from the plane of the elongated arm portion 47 of the pedal.

The arm portion 42, adjacent its proximal end, is connected to one end of a contractile spring 48 that projects laterally outwardly from the arm portion, said spring being hooked as at 49 to the instrument panel 17, so as to normally swing the pedal to its full line position shown in Figure 2, in which it lies in a plane normal to the pivot axis 16 of the main lever 39.

Referring to Figures 6–9, and in particular to Figures 7 and 8, the pedal 42, when shifted laterally, is adapted to impart a corresponding lateral swinging movement to a throttle-operating arm 50. The arm 50 has an inner end pivotally attached to the underside of the flange 12 (Figure 9) by means of a bolt 52, said bolt 52 being coaxially aligned with the spindle 38 (Figure 4) when the pedal 42 is being used for controlling the acceleration of the vehicle, and is not being used for applying the brakes.

The arm 50 overlies the proximal end of the pedal 42, and is integrally formed, at its distal end, with a laterally projecting, longitudinally curved cross member or finger 54 which as shown in Figure 6 is extended for the greatest part of its length at one side of the arm 50, but is extended for a short distance as at 56 laterally from the opposite side of the arm 50. Finger 54 provides a guide for the pedal 42, in certain circumstances to be described in detail hereinafter, and further serves as a means providing a connection to the throttle linkage, and also as a means normally engaged by the arm portion 47 to effect conjoint lateral swinging movement of the arm 50 and the pedal.

In this connection, and referring now to Figures 4 and 9, integrally formed on the proximal end of the arm portion 47 is a forwardly projecting actuating arm 58, formed integrally with the arm portion 47 and constituting a part of the combination pedal. The actuating arm 58 normally seats, as shown in Figure 7, in a downwardly opening recess formed in the underside of the distal end of the arm 50. Integrally formed upon the projection 56 and extending downwardly from said projection, at one side of the recess 59, is an abutment finger or stop 57.

Adjustable stops are provided at opposite sides of the inner end portion of the arm 50, to limit swinging movement of the same laterally in opposite directions. Said adjustable stops comprise coaxially aligned, confronting screws 62, which are threadedly engaged in the bracket at opposite sides of the arm 50. One screw, shown at the left in Figure 7, is engaged in a threaded opening of the plate 11 adjacent flange 12. The other screw, designated at 62, is threadedly engaged in a depending stop support plate 64, said depending plate 64 being integral with the flange 12 and being disposed in a plane parallel to that of the plate 11. An elongated, downwardly and forwardly curving stop arm 66 (Figures 6–8) is secured by vertically spaced screws 68 to the plate 64, with the screws 62 being threadedly engaged in an opening of the plate 64. Screws 60, 62 are threadable toward and away from each other, so as to provide a space of adjustable width within which the inner end portion of the arm 50 is permitted lateral swinging movement, within limits determined by the selectively located, confronting inner ends of the screws 60, 62.

A connecting rod 70, threaded at its opposite ends, is threadedly connected at one end of a clevis 71 (Figures 6 and 7) that embraces and is pivotally attached to the projection 56. Rod 70 projects laterally outwardly from the arm 50, and at its outer end has a clevis pivotally connected to one end of a bell crank 72, fulcrumed on a pin 74 carried by a downwardly offset lateral extension 76 of the support bar 14. The bell crank includes a long arm 78 projecting rearwardly toward the fire wall 19, and connected at 79 to the cable that extends to the carburetor for operating the throttle, said cable extending through an opening of the fire wall 19.

Normally pulling the connecting rod 70 outwardly from the arm 50, that is, to the left in Figure 2, is a contractile spring 80 connected at one end to the outer end of the rod 70, and hooked at its other end through an opening of a vertical wall 82 secured to the instrument panel 17 in back of the same.

Considering now the operation of the device, it will be seen that the entire device can be mounted as a unit upon the underside of the support bar 14. Assuming that suitable connections have been made to the brake lines of the vehicle, and to the throttle-operating linkage of said vehicle, one is enabled to control both the throttle setting and the brake, from the single pedal 42.

Assuming that the vehicle is in normal operation, if one lifts the shoe S from the pedal, the pedal will automatically move to the upper, full line position shown in Figure 1, and also will automatically move to the full line position of Figure 2, that is, to a plane perpendicularly intersecting the pivot axis 16 of the main lever 39.

In this connection, and referring to Figure 1, it will be noted that the main lever 39 includes, in addition to the arm 20 and the spindle 38, a rearwardly projecting, flat locking cam 84, in the form of a plate member lying in a plane perpendicularly intersecting the pivot axis of the main lever. The cam plate 84 has on its top edge an arcuate, shallow locking depression or notch 86. Referring now to Figures 4 and 9, engageable in said depression is a roller 88 carried by the outer end of a vertically swingable roller support arm 90, the inner end of which is swingably supported upon a laterally projecting pin 92 mounted upon the plate 11. A contractile, coil spring 94 is connected between the roller-carrying end of arm 90, and plate 11, so as to normally bias the roller downwardly into the locking notch 86.

It will be seen that the expansion of the spring 30 will urge rod 22 outwardly of the housing 31 of the master cylinder, causing lever 39 to be swung clockwise about its pivot 16. As a result, the roller 88 will move from its Figure 9 to its Figure 4 position. In its Figure 4 position, the roller 88 is engaged in the notch 86, and the pedal is elevated to its Figure 1 position, with the brakes completely released. Further, the pedal will be in the vertical plane perpendicularly intersecting the axis defined by the pin 16, that is, the pedal will be in its full line position of Figure 2, under the pull of the spring 48. In this position of the pedal 42, the bell crank 72 is rocked to a position in which the throttle is set at "idle." Further, the brake is in released position, as will be understood by reason of the fact that the arm 20 is in its Figure 4 position with push rod 22 retracted in respect to the master cylinder housing 31.

During normal operation of the vehicle, the driver merely shifts the pedal to the right in Figure 2 from its normal, rest position shown in full lines, to a selected extent. On swinging of the accelerator pedal to the right in Figure 2, the rod 70 is correspondingly shifted to the right, swinging bell crank 72 in a direction to exert a pull upon the throttle cable, so as to open the throttle for acceleration of the vehicle. The extent to which the throttle is opened is governed, of course, by the extent to which the driver swings the pedal 42 to the right. The pedal is shown in what would normally be its extreme vehicle-accelerating position, that is, with the throttle fully open, in dotted lines in Figure 2.

At any point to which the pedal is laterally swung between its opposite extreme positions shown in dotted and full lines in Figure 2, it can be instantaneously depressed for the purpose of applying the brakes. It will be understood, of course, that when the pedal is being swung laterally, it is pivoting about the spindle 38, with the lever 39 stationary and held in releasably locked position by the roller 88.

Assuming that the brake is to be depressed, on a downward pressure being exerted upon the foot plate 44, the pedal is swung from its full to its dotted line position of Figure 1. As a result, and referring now to Figures 7 and 8, the laterally swung pedal of Figure 7 is shifted downwardly as shown in Figure 8, to disengage the arm 58 from the recess 59. The result is that the spring 80 is now free to contract, so as to instantaneously snap the connecting rod 70 in an axial direction, to the left in Figures 2 and 8, causing the arm 50 to be swung laterally to its normal "idle" position of Figure 8 to immediately close the throttle and return the engine to an "idle" operating condition.

This happens simultaneously with depression of pedal 42 to a brake-applying position. When the pedal is depressed, the lever 39 swings counterclockwise in Figure 9 about the axis defined by the pin 16, so that push rod 22 is urged to the right in Figure 9, into its pressure stroke, so as to apply the brakes. On release of the brake, that is, on lifting of the shoe S and movement of the shoe to the left in Figure 2, the pedal, as previously described herein, swings back upwardly to its normal position shown in Figure 1 in full lines, and at the same time, swings to the left from its dotted to its full line position of Figure 2, so as to be in a brake-releasing position with the throttle at "idle." The vehicle can now be accelerated in the regular manner, awaiting the next application of the vehicle brake.

It is to be noted that the roller 88 constitutes an indexing means, movable between the positions of Figures 4 and 9. In the Figure 4 position, there is a positive hold on the pedal, retaining the same in its upwardly swung position, and the normal light pressure exerted by the shoe downwardly on the foot plate 44 will not be sufficient to overcome the locking engagement between cam 84 and roller 88, so that the pedal will not be depressed. Only when a positive downward pressure is exerted against plate 44, as for example when the brakes are to be applied, is the force of the spring 94 overcome, so that the roller 88 moves out of the notch 86 to the Figure 9 position of the roller.

Further, when the brakes are released and the pedal swings back up to its normal position, the operator, through his light pressure of the foot on the pedal, "feels" that the pedal is firm beneath his foot, and is in a brake-releasing position, ready for acceleration of the vehicle.

It will be seen that the invention provides an improved combination accelerator and brake control, adapted for installation in conventional automotive vehicles without requiring modification or redesign of said vehicles, except perhaps to a small extent. It will further be noted that the invention is particularly designed for ease in maintenance and repair, by reason of the disposition of the entire mechanism within the passenger compartment, in back of the instrument panel. Still further, the construction is designed to suspend the combination pedal from an overhead support, rather than mount said pedal upon a support projecting upwardly from the floor board, this arrangement having the desirable characteristic of facilitating installation of the device in modern vehicles, almost all of which have the pedal suspended in the manner shown in the drawing, rather than mounted upon the floor board.

It is believed clear that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A combined accelerator and brake operator for vehicles, comprising: a sationary support adapted for mounting in back of a vehicle instrument panel above the vehicle floor board; a pedal extending downwardly from said support and having an upper end pivotally connected to the support, said pedal pivoting at said upper end thereof about a first axis extending in an up and down direction and about a second, generally horizontal axis, the pedal having a foot plate at its lower end; means releasably engaged with the pedal for operating the throttle of the vehicle responsive to movement of the pedal about the first axis; and means connected to the pedal for operating the vehicle brakes responsive to movement of the pedal about its second axis, said throttle operating means including a mechanical linkage engageable at one end by the pedal intermediate opposite ends of the pedal and extending laterally from the pedal, said linkage including a bell crank, a connecting rod connected at one end to one end of the bell crank, said bell crank being fulcrumed on said support and being connected at its other end to the vehicle throttle, an arm pivoted on said support above said upper end of the pedal for swinging movement independently of the pedal about said first axis, an arcuate cross member rigid with said arm and curving about said first axis, said cross member having a downwardly opening recess and being pivotally connected to the other end of the connecting rod, and an actuating arm rigid with the pedal and seating in said recess in one position to which the pedal is swung about the second axis.

2. A combination accelerator and brake operator for vehicles, comprising: a stationary supporting structure mountable in a vehicle; a master brake cylinder housing stationarily mounted upon said structure; a master cylinder push rod mounted in said cylinder for straight-line movement between brake-releasing and brake-applying positions; a lever connected intermediate its ends to said structure for swinging movement about a generally horizontal axis and having a pivotal connection to the push rod for shifting the push rod to a brake-applying position in response to swinging of the lever in one direction from a normal rest position thereof; cooperating detent means on the lever and on said structure respectively, releasably interengaging in said normal position of the lever to retain the lever in said normal position thereof; a combined accelerator and brake pedal connected at one end to the other end of the lever for pivotal movement in respect to the lever in a generally horizontal direction with the detent means interengaged, and for movement conjointly with the lever in said direction of swinging movement of the lever about the lever axis with the detent means disengaged; and throttle-operating means mounted upon said supporting structure and releasably engaged by the pedal for operation thereby during said generally horizontal swinging movement of the pedal, said pedal being shifted out of engagement with the throttle-operating means when moving conjointly with the lever in said direction.

3. A combination accelerator and brake operator for vehicles as in claim 2, wherein the detent means comprises a plate formed upon and projecting outwardly from the lever, said plate having a notch, said detent means further including arm means pivotally mounted on said supporting structure adjacent the plate under spring bias tending to retain the arm means in engagement with the plate, said arm means being engaged in the notch in said normal position of the lever.

4. A combination accelerator and brake operator for vehicles as in claim 3, and said plate having an edge surface adjacent said notch along which the arm means moves when the lever is traveling in said direction about its axis.

References Cited in the file of this patent

UNITED STATES PATENTS

| | | |
|---|---|---|
| 2,455,329 | Cook | Nov. 30, 1948 |
| 2,707,036 | Hollub | Apr. 26, 1955 |
| 2,792,092 | Fong | May 14, 1957 |
| 2,811,868 | Ayers | Nov. 5, 1957 |

FOREIGN PATENTS

| | | |
|---|---|---|
| 1,125,769 | France | July 16, 1956 |